Patented June 10, 1924.

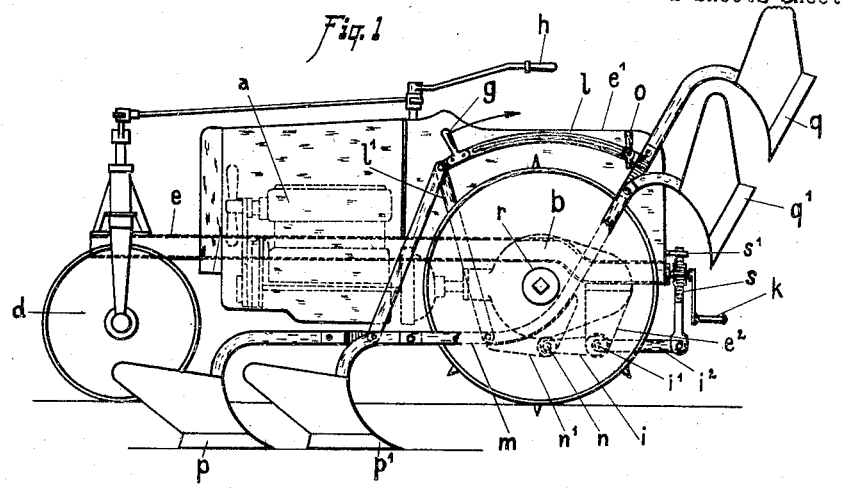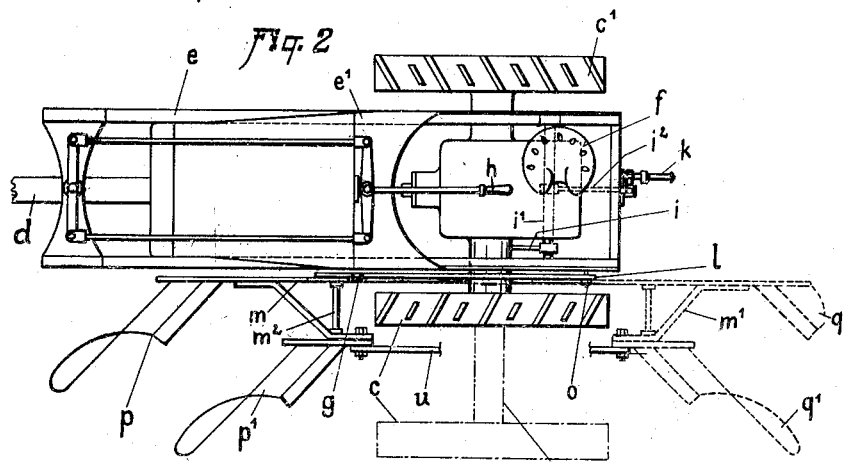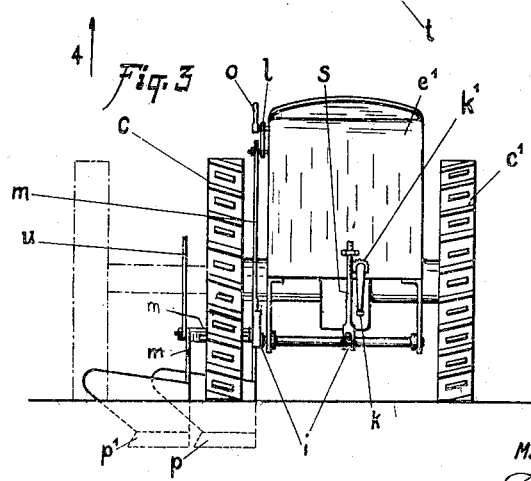

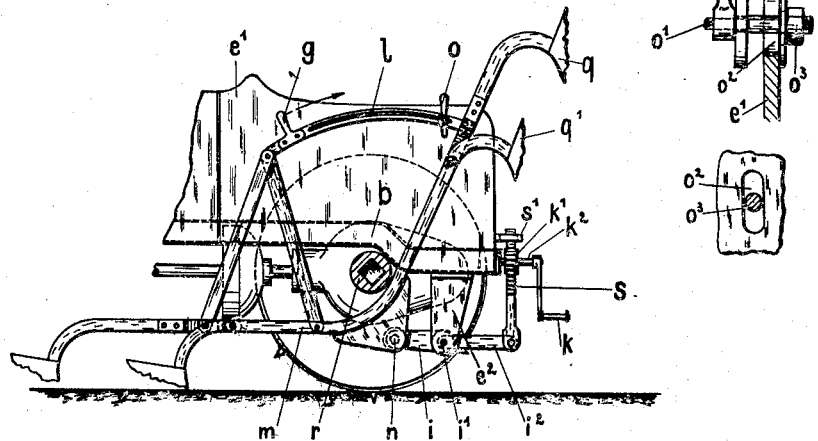
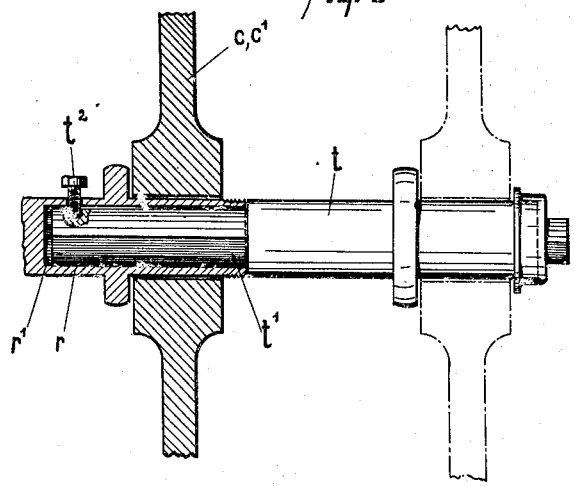

1,497,488

UNITED STATES PATENT OFFICE.

MATTHÄUS CHEMNITZ, OF DUSSELDORF, GERMANY.

MOTOR PLOW.

Application filed June 8, 1923. Serial No. 644,231.

*To all whom it may concern:*

Be it known that I, MATTHÄUS CHEMNITZ, a citizen of Germany, residing at Dusseldorf, Germany, have invented certain new and useful Improvements in Motor Plows (for which I have filed application in Germany, November 8, 1921), of which the following is a specification.

My invention relates to improvements in motor plows, and the object of the improvements is to provide a plow which can be used for plowing small areas, and which can also be used for rolling, harrowing or other agricultural work as well as for traction purposes. With this object in view my invention consists in providing an apparatus in which the plow proper is disposed below the driving axle of a traction apparatus, and in which the member supporting the plow is located at the side of the traction apparatus and between the frame and one of the driving wheels thereof. To relieve the torque action of the plow beam on the axle of the driving wheels, said axle is so constructed as to be extensible, the elongation of said axle being accomplished by the use of a subsidiary axle or the like for shifting the driving wheel outside of the plow beam away from the latter so that said driving wheel is adapted to move through the furrow lengthwise thereof without the tendency to turn.

For the purpose of explaining the invention an example embodying the same has been shown in the accompanying drawings, constituting a part of this specification.

In the drawings Fig. 1, is an elevation showing the plow,

Fig. 2, is a plan view thereof,

Fig. 3, is a rear view,

Fig. 4, is a partial elevation viewed in the direction of the arrows 4, 4 in Fig. 2 and with the wheel adjacent to the plow removed, Fig. 5, is a detail view partly in section showing a part of the axle of the driving wheels with the subsidiary axle secured thereto, and Fig. 6, is a detail view showing the nut for fixing the plow in position.

Referring to the embodiment of the invention shown in the drawings the same reference characters designating the corresponding parts in all views thereof the motor plow comprises a frame $e$ equipped with two driving wheels $c$ and $c^1$ and a steering wheel $d$, a motor $a$, a gearing $b$ intermediate the motor and the axle $r$ of the driving wheels, a driver's seat $f$, and steering mechanism $h$ connected with the steering wheel. The motor and associated parts are covered by a hood $e'$ of sheet metal. These parts are known in the art and therefore need no detailed description.

Between the frame $e$ and the driving wheel $c$ there is a plow beam in the form of a cranked lever $m$, which carries at both ends plow shares $p$ and $q$ arranged for plowing in opposite directions. To the beam $m$ subsidiary shares $p^1$ and $q^1$ are secured by means of braces $m^1$, stay bolts $m^2$ and a subsidiary beam member $u$, said subsidiary shares being located at the outer side of the wheel $c$. A pair of braces $l^1$ have their lower ends secured to the beam $m$ and their upper ends secured to one end of a slotted segment $l$, the opposite end of the segment being secured to the beam $m$. The slot of the segment engages a bolt $o^1$ secured to the hood $e^1$ by a slot $o^2$ and a nut $o^3$ and having a clamping nut $o$ screwed thereto. The beam $m$ is fulcrumed on a pivot bolt $n$ disposed below the axle $r$ of the driving wheels and on a lever $i$ secured to a rock shaft $i^1$ mounted in brackets $e^2$ depending from the frame $e$. To an arm $i^2$ secured to the shaft $i^1$ a link $s$ is jointed, which is guided at its top end in an eye $s^1$ secured to the hood $e^1$, and which is formed with rack teeth $s^2$ engaged by a pinion $k^1$ keyed to a shaft $k^2$ carrying a crank $k$ adapted to be operated by hand for raising or lowering the beam $m$ and varying the depth of the furrow.

In my improved plow the wheel $c$ is adapted to be shifted laterally a suitable distance away from the beam $m$, to relieve the torque on the axle caused by the resistance of the shares in plowing. As appears more particularly from Fig. 5 a subsidiary axle $t$ is provided adapted to be fixed to the end of the axle $r$; as shown the axle $r$ being formed with an axial socket $r^1$ adapted to receive the reduced end $t^1$ of the subsidiary axle $t$. A set screw $t^2$ is provided for fixing the subsidiary axle in position. Prior to shifting the wheel $c$ in the manner described the beam member $u$ is disconnected from the member $m$.

For tilting the plow beam $m$ a handle $g$ is secured to the segment $l$. When it is desired to drive over roads the plow is set in position with both sets of shares out of operative position.

I claim:

1. A plow attachment for a tractor having a frame, a driving axle and driving wheels mounted on said axle, said attachment comprising a plow beam bent intermediate its ends at approximately a right angle and adapted to be pivoted, adjacent the apex of said bend, to the frame of the tractor below the driving axle and between the frame and one of the driving wheels of the tractor, and plow shares carried by the opposite ends of said beam, said plow shares extending in opposite directions.

2. A plow attachment for a tractor having a frame, a driving axle and driving wheels mounted on said axle, said attachment comprising a beam adapted for pivotal connection to the frame of a tractor below the driving axle of the latter, laterally of said frame and between the latter and one of the driving wheels of the tractor, plow shares mounted at the ends of said beam, said plow shares being reversely directed, said beam being bent at substantially a right angle adjacent said pivot, means for rocking said beam to raise one of said plow shares and to lower the other plow share, and means for attachment to said tractor and associated with said beam for holding said beam in any position in which it may be adjusted.

3. A plow attachment for a tractor having a frame, a driving axle and driving wheels mounted on said axle, said attachment comprising a hanger for attachment to the frame of a tractor below its driving axle, a beam bent intermediate its ends at approximately a right angle and pivoted adjacent said bend to said hanger so as to extend between the frame and one of the driving wheels of the tractor, and plow shares carried by the opposite ends of said beam.

4. A plow attachment for a tractor having a frame, an extensible driving axle and driving wheels mounted on said axle, said attachment comprising a plow beam bent between its ends at approximately a right angle and adapted to be pivotally mounted adjacent said bend upon the frame of said tractor below the axle of the tractor and between the frame of the tractor and the driving wheel carried by said extensible axle, and plow shares carried by the opposite ends of said beam.

5. A plow attachment for a tractor having a frame, a driving axle and driving wheels mounted on said axle, said attachment comprising a plow beam having means for pivotal connection to one side of the frame of a tractor at a point below the driving axle of the latter and between the frame and one of the driving wheels of the tractor, plow shares carried by the ends of said beam and extending in reverse directions, said beam being bent approximately at a right angle adjacent said pivot, a segmental member having said pivot as its center and having its opposite ends connected to said beam on opposite sides of said pivot, and means for attachment to the tractor and adapted to be clamped to said segment at any point along the length of the latter for holding said beam in any position of adjustment.

6. A plow attachment for a tractor having a frame, a driving axle, and driving wheels mounted on said axle, said attachment comprising a rock shaft and means for mounting same transversely of the frame of a tractor and below the driving axle thereof, a pair of levers extending in opposite directions from said rock shaft, a plow beam bent intermediate its ends at substantially a right angle and pivoted adjacent the apex of said bend to one of said levers, a plow share carried by each of the opposite ends of said beam, said plow shares extending in opposite directions to one another, and means for attachment to the tractor and associated with said other lever for raising and lowering the latter to rock said shaft and vary the degree of penetration of either of said plow shares into the ground.

In testimony whereof I have hereunto set my hand.

MATTHÄUS CHEMNITZ.